US012609494B2

(12) United States Patent
Lee et al.

(10) Patent No.: US 12,609,494 B2
(45) Date of Patent: Apr. 21, 2026

(54) CONNECTOR

(71) Applicant: LS MTRON LTD., Anyang-si (KR)

(72) Inventors: Su Chan Lee, Anyang-si (KR); Kyung Hae Choi, Anyang-si (KR); Jung Hoon Choi, Anyang-si (KR); Hyun Joo Hwang, Anyang-si (KR)

(73) Assignee: LS MTRON LTD., Anyang-Si (KR)

( * ) Notice: Subject to any disclaimer, the term of this patent is extended or adjusted under 35 U.S.C. 154(b) by 293 days.

(21) Appl. No.: 18/278,563

(22) PCT Filed: Mar. 20, 2022

(86) PCT No.: PCT/KR2022/004005
§ 371 (c)(1),
(2) Date: Aug. 23, 2023

(87) PCT Pub. No.: WO2022/203365
PCT Pub. Date: Sep. 29, 2022

(65) Prior Publication Data

US 2024/0146006 A1 May 2, 2024

(30) Foreign Application Priority Data

Mar. 26, 2021 (KR) ........................ 10-2021-0039638
Mar. 15, 2022 (KR) ........................ 10-2022-0032007

(51) Int. Cl.
*H01R 24/50* (2011.01)
*H01R 9/05* (2006.01)
(Continued)

(52) U.S. Cl.
CPC ........... *H01R 24/50* (2013.01); *H01R 9/0503* (2013.01); *H01R 13/502* (2013.01); *H01R 13/639* (2013.01)

(58) Field of Classification Search
CPC .............................. H01R 12/75; H01R 12/716
See application file for complete search history.

(56) References Cited

U.S. PATENT DOCUMENTS 5,762,505 A 6/1998 Lin
7,309,237 B2 * 12/2007 Kuo .................. H01R 13/6593 439/495
(Continued)

FOREIGN PATENT DOCUMENTS

JP 2001307822 A 11/2001
JP 2006127989 A 5/2006
(Continued)

OTHER PUBLICATIONS

Office Action for related Japanese Application No. 2023-540980; action dated Nov. 19, 2024; (5 pages).
(Continued)

*Primary Examiner* — Neil Abrams
(74) *Attorney, Agent, or Firm* — K&L Gates LLP

(57) ABSTRACT

This disclosure relates to a connector comprising a first RF contact; a second RF contact spaced apart from the first RF contact in a first axis direction; an insulation part; and a cover shell, wherein the first RF contact includes a (1-1)th RF linker member connecting with an RF contact of the other connector; a (1-2)th RF linker member spaced apart from the (1-1)th RF linker member on the basis of a second axis direction perpendicular to the first; and a first RF linker member arranged between the (1-1)th RF linker member and the (1-2)th RF linker member on the basis of the second axis direction, the insulation part includes a first RF inspection window arranged between the (1-1)th RF linker member and the (1-2)th RF linker member on the basis of the second axis direction, and the first RF linker member is exposed through the first RF inspection window.

14 Claims, 14 Drawing Sheets

(51) Int. Cl.

| | |
|---|---|
| ***H01R 13/502*** | (2006.01) |
| ***H01R 13/639*** | (2006.01) |

(56) References Cited

U.S. PATENT DOCUMENTS

| | | | | | |
|---|---|---|---|---|---|
| 7,553,167 | B2 * | 6/2009 | Zhang | H01R 9/2416 439/597 |
| 7,828,585 | B2 * | 11/2010 | Kurimoto | H01R 12/714 439/942 |
| 7,946,882 | B2 * | 5/2011 | Wu | H01R 13/648 439/607.41 |
| 8,043,114 | B2 * | 10/2011 | Kaneko | H01R 12/775 439/468 |
| 9,039,441 | B2 * | 5/2015 | Takamori | H01R 12/774 439/495 |
| 9,287,643 | B2 * | 3/2016 | Yoshida | H01R 12/716 |
| 9,647,401 | B2 * | 5/2017 | Sato | H01R 24/005 |
| 10,622,759 | B2 * | 4/2020 | Shih | H01R 13/506 |
| 11,108,173 | B2 * | 8/2021 | Okada | H01R 9/0518 |
| 11,108,174 | B2 * | 8/2021 | Hayashi | H01R 12/716 |
| 2008/0026612 | A1 | 1/2008 | Malstrom et al. | |
| 2011/0306229 | A1 * | 12/2011 | Katsui | H01R 13/629 439/345 |

FOREIGN PATENT DOCUMENTS

| | | | |
|---|---|---|---|
| JP | 2019133814 | A | 8/2019 |
| JP | 2019530164 | A | 10/2019 |
| JP | 2020068163 | A | 4/2020 |
| JP | 2020123438 | A | 8/2020 |
| KR | 1020100070742 | | 6/2010 |
| KR | 101166431 | | 7/2012 |
| KR | 1020160144854 | | 12/2016 |
| KR | 1020200145713 | | 12/2020 |

OTHER PUBLICATIONS

International Search Report for related International Application No. PCT/KR2022/004005; action dated Sep. 29, 2022; (2 pages).

Written Opinion for related International Application No. PCT/KR2022/004005; action dated Sep. 29, 2022; (5 pages).

Office Action for corresponding Japanese Application No. 2023-540980; action dated Jul. 2, 2024; (4 pages).

* cited by examiner

CONNECTOR

CROSS-REFERENCE TO RELATED APPLICATION

This application is a National Stage of International Application No. PCT/KR2022/004005 filed on Mar. 22, 2022, which claims priority to and the benefit of Korean Patent Application No. 10-2021-0039638, filed on Mar. 26, 2021, and Korean Patent Application No. 10-2022-0032007, filed on Mar. 15, 2022, the disclosures of which are incorporated herein by reference in their entirety.

FIELD

The present disclosure relates to a connector which is installed in an electronic device electrical connection.

BACKGROUND

A connector is provided in various electronic devices for electrical connection. For example, the connector is installed in an electronic device such as a mobile phone, a computer, a tablet computer and the like such that various parts installed in the electronic device can be electrically connected to each other.

In general, among electronic devices, RF connectors that transmit radio frequency (RF) signals, board-to-board connectors (hereinafter, referred to as 'a board connector') that process digital signals such as cameras and the like are provided inside wireless communication devices such as smartphones, tablet PCs and the like.

FIG. 1 is a schematic perspective view of a connector 10 according to the related art.

Referring to FIG. 1, the connector 10 according to the related art is implemented such that a contact 11 which is coupled to an insulation part 12 forms a single contact point with the contact of a counterpart connector. Accordingly, the connector 10 according to the related art can be mounted on a first module 14 at a position where the contact 11 protrudes to the outside of a cover shell 13. In this case, the connector 10 according to the related art could determine whether the contact 11 is mounted on the outside of the cover shell 13. However, recently, in the connector 10 according to the related art, as the contact 11 is implemented such that a double contact point is formed with the contact of a counterpart connector, the contact 11 is mounted on the first module 14 inside the cover shell 13. Accordingly, in the connector 10 according to the related art, the mounted portion of the contact 11 is covered by the insulation part 12. Therefore, the connector 10 according to the related art has a problem in that it is difficult to determine whether the contact 11 is mounted. In addition, the connector 10 according to the related art has a problem in that when conducting an energization test on the contact 11, the space for disposing a probe is narrow, and thus, the energization test cannot be properly performed.

SUMMARY

The present disclosure has been devised to solve the above-described problem, and it is directed to providing a connector in which it is possible to determine whether the RF contact and the ground contact mounted on the inside of the cover shell are mounted, and a space is provided where a probe can be arranged when conducting an energization test.

In order to solve the above-described problems, the present disclosure may include the following configurations.

The connector according to the present disclosure may include a first RF contact for transmitting a radio frequency (RF) signal; a second RF contact which is arranged to be spaced apart from the first RF contact in a first axis direction; an insulation part to which the first RF contact and the second RF contact are coupled; and a cover shell to which the insulation part is coupled. The first RF contact may include a (1-1)th RF linker member for connecting with an RF contact of a counterpart connector; a (1-2)th RF linker member which is arranged to be spaced apart from the (1-1)th RF linker member based on a second axis direction (Y-axis direction) that is perpendicular to the first axis direction (X-axis direction); and a first RF linker member which is arranged between the (1-1)th RF linker member and the (1-2)th RF linker member based on the second axis direction (Y-axis direction). The insulation part may include a first RF inspection window which is arranged between the (1-1)th RF linker member and the (1-2)th RF linker member based on the second axis direction (Y-axis direction). The first RF linker member may be arranged to be exposed through the first RF inspection window.

The connector according to the present disclosure may include a first RF contact for transmitting a radio frequency (RF) signal; a second RF contact which is arranged to be spaced apart from the first RF contact in a first axis direction (X-axis direction); an insulation part to which the first RF contact and the second RF contact are coupled; a cover shell to which the insulation part is coupled; and a ground contact which is coupled to the insulation part between the first RF contact and the second RF contact. The ground contact may include a first ground linker member for being connected to a partition wall of a counterpart connector, a second ground linker member which is disposed spaced apart from the first ground linker member based on a second axis direction (Y-axis direction) that is perpendicular to the first axis direction (X-axis direction), and a ground linker member which is disposed between the first ground linker member and the second ground linker member based on the second axis direction (Y axis direction). The insulation part may include a ground inspection window which is disposed between the first ground linker member and the second ground linker member based on the second axis direction (Y-axis direction). The ground linker member may be disposed to be exposed through the ground inspection window 245.

The connector according to the present disclosure may include a first RF contact for transmitting a radio frequency (RF) signal; a second RF contact which is arranged to be spaced apart from the first RF contact in a first axis direction (X-axis direction); an insulation part to which the first RF contact and the second RF contact are coupled; a cover shell to which the insulation part 330 is coupled; a first coaxial cable which is electrically connected to the first RF contact; and a second coaxial cable which is spaced apart from the first coaxial cable along the first axial direction (X-axis direction) and electrically connected to the second RF contact. The cover shell 380 may include a locking part 390 which is fixed to the insulation part 330 by using a hook. The locking part may include a locking protrusion which is formed on the insulation part, a locking groove which is formed on the cover shell, and a support protrusion for supporting the locking protrusion which is inserted into the locking groove.

According to the present disclosure, the following effects can be achieved.

The present disclosure may be implemented such that each of the first RF linker member and the second RF linker member is exposed toward the inner space of the cover shell through the first RF inspection window and the second RF inspection window formed in the insulation part. Therefore, the present disclosure can determine whether the first RF contact and the second RF contact are mounted with the naked eye through the first RF inspection window and the second RF inspection window. In addition, the present disclosure can secure a space in which a probe can be arranged when conducting an energization test for the first RF contact and the second RF contact through the ground inspection window.

The present disclosure can be implemented such that the ground linker member is exposed toward the inner space of the cover shell through the ground inspection window formed in the insulation part. Therefore, in the present disclosure, it is possible to determine whether the ground contact is mounted with the naked eye through the ground inspection window. In addition, the present disclosure can secure a space in which a probe can be arranged when conducting the energization test for the ground contact through the ground inspection window.

DETAILED DESCRIPTION

Hereinafter, the exemplary embodiments of a connector according to the present disclosure will be described in detail with reference to the accompanying drawings.

Figure 1:
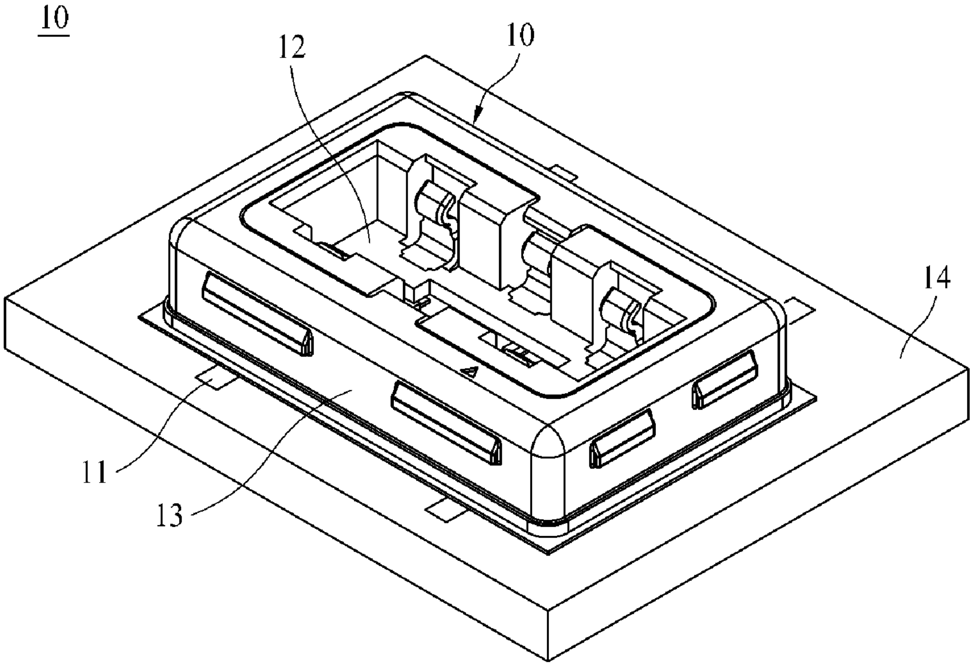
FIG. 1 is a schematic perspective view of a connector according to the related art.
Figure 2:
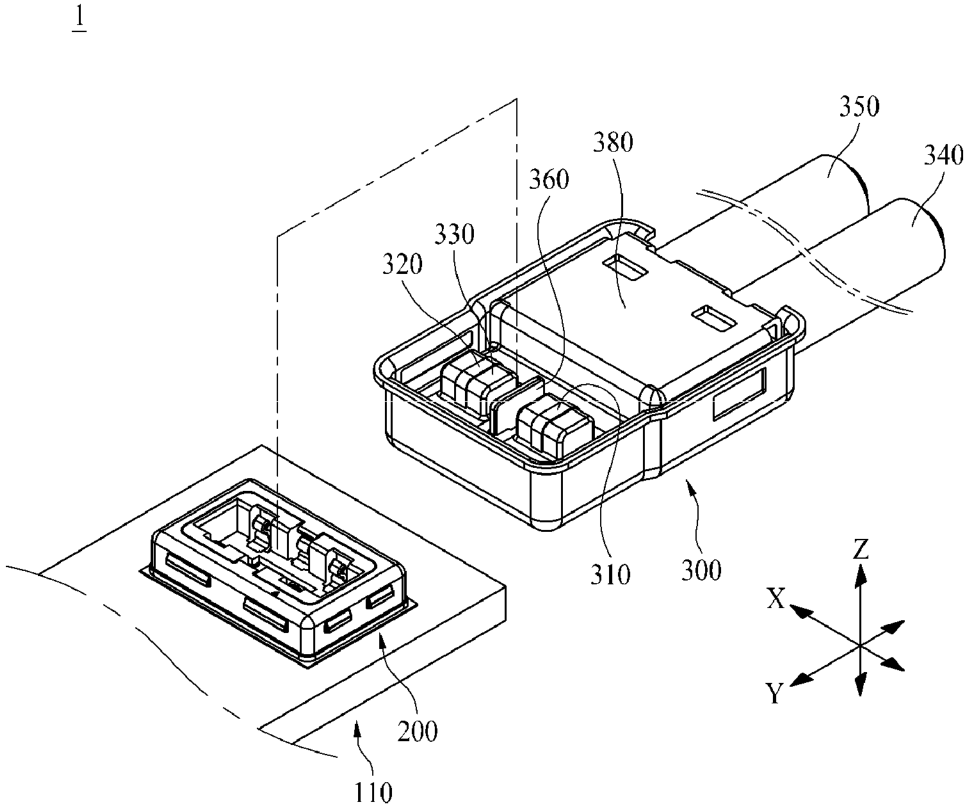
FIG. 2 is a schematic perspective view of a connector according to the first example and a connector according to the second example in the connector according to the present disclosure.

Referring to FIG. 2, the connector 1 according to the present disclosure may be installed in an electronic device (not illustrated) such as a mobile phone, a computer, a tablet computer and the like. The connector 1 according to the present disclosure may be used to electrically connect a plurality of modules (not illustrated) that are disposed to be spaced apart from each other in an electronic device. The modules may be configurations constituting components used for electronic device communication, such as an antenna, a main board and the like. For example, when the first module 110 and the second module (not illustrated) are electrically connected, the first module 110 may be an antenna module, and the second module may be a driving module for driving the antenna module, a transceiver module for transmitting and receiving a signal to and from the antenna module or the like. Accordingly, a receptacle connector which is connected to the first module 110 and a plug connector which is connected to the second module may be connected to each other. Accordingly, the first module 110 and the second module may be electrically connected through the receptacle connector and the plug connector. A plug connector which is connected to the first module 110 and a receptacle connector which is connected to the second module may be connected to each other.

The connector 1 according to the present disclosure may be implemented as the receptacle connector. The connector 1 according to the present disclosure may be implemented as the plug connector. The connector 1 according to the present disclosure may be implemented by including both of the receptacle connector and the plug connector. Hereinafter, an exemplary embodiment in which the connector 1 according to the present disclosure is implemented as the receptacle connector is defined as the connector 200 according to the first example, and an exemplary embodiment in which the connector 1 according to the present disclosure is implemented as the plug connector is defined as the connector 300 according to the second example to describe the present disclosure in detail with reference to the accompanying drawings. In addition, the description will be based on an exemplary embodiment in which the connector 200 according to the first example is connected to the first module 110 and the connector 300 according to the second example is connected to the second module. From these, it will be apparent to a person skilled in the art to which the present disclosure pertains to derive an exemplary embodiment in which the connector 1 according to the present disclosure includes both of the receptacle connector and the plug connector.

Connector 200 According to the First Example

Referring to FIGS. 2 to 6, the connector 200 according to the first example may include a first RF contact 210, a second RF contact 220, a ground contact 250, an insulation part 240 and a cover shell 230.

The first RF contact 210 is for transmitting a radio frequency (RF) signal. The first RF contact 210 may transmit a very high-frequency RF signal. The first RF contact 210 may be supported by the insulation part 240. The first RF contact 210 may be coupled to the insulation part 240 through an assembly process. The first RF contact 210 may be integrally formed with the insulation part 240 through injection molding.

Referring to FIGS. 2 to 6, the first RF contact 210 according to the present disclosure may include a (1-1)th RF linker member 211, a (1-2)th RF linker member 212 and a first RF linker member 213.

The (1-1)th RF linker member 211 is for connecting to an RF contact of a counterpart connector. The (1-1)th RF linker member 211 may be connected to one side of the first RF linker member 213. The (1-1)th RF linker member 211 may be coupled to the first RF linker member 213 so as to protrude upwardly (Z-axis direction) from the first RF linker member 213.

The (1-2)th RF linker member 212 is disposed to be spaced apart from the (1-1)th RF linker member 211 based on the second axis direction (Y-axis direction) that is perpendicular to the first axis direction (X-axis direction). The (1-2)th RF linker member 212 may be coupled to the first RF linker member 213 to protrude upwardly (Z-axis direction) from the first RF linker member 213. The (1-2)th RF linker member 212 may be disposed to face each other with the (1-1)th RF linker member 211 in the second axis direction (Y-axis direction). The (1-2)th RF linker member 212 may be connected to an RF contact of the counterpart connector. The (1-2)th RF linker member 212 may be connected to the other side of the first RF linker member 213. Accordingly, the (1-1)th RF linker member 211 and the (1-2)th RF linker member 212 may be connected to different portions of the RF contact of the counterpart connector to implement a double contact. The RF contact of the counterpart connector may be inserted between the (1-2)th RF linker member 212 and the (1-1)th RF linker member 211.

The first RF linker member 213 is disposed between the (1-1)th RF linker member 211 and the (1-2)th RF linker member 212 based on the second axis direction (Y-axis direction). The (1-1)th RF linker member 211 and the (1-2)th RF linker member 212 may be connected to each other through the first RF linker member 213. The first RF linker member 213 may be mounted on the first module 110. Accordingly, the first RF contact 210 may be electrically connected to the first module 110 through the first RF linker member 213.

Figure 6:
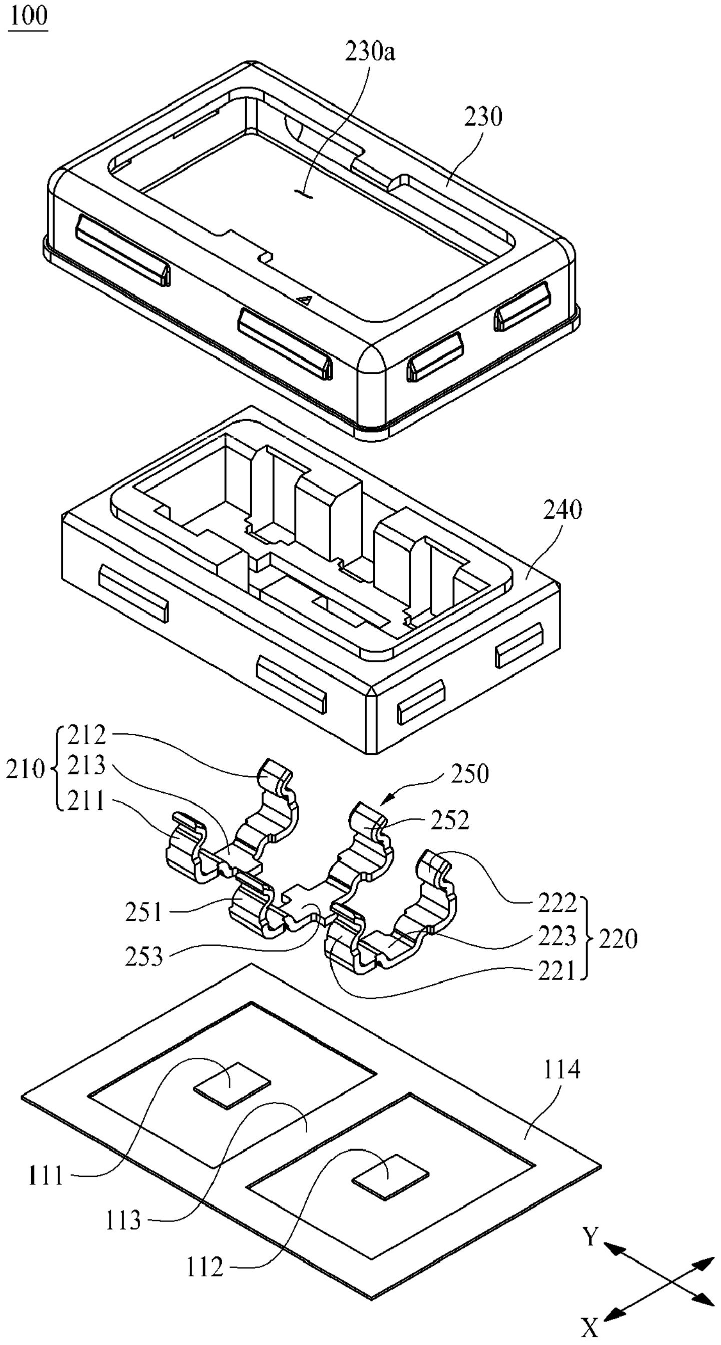
FIG. 6 is a schematic exploded perspective view of the connector according to the first example.

For example, as illustrated in FIG. 6, a first RF mounting pattern 111 may be formed on the first module 110. The first RF mounting pattern 111 is for mounting the first RF contact 210. That is, in order for the first RF contact 210 to be electrically connected to the first module 110, the first RF contact 210 may be soldered to the first RF mounting pattern 111. The first RF linker member 213 may be mounted on the first RF mounting pattern 111. In this case, the first RF linker member 213 may be mounted on a part of the first RF mounting pattern 111. Accordingly, the first RF mounting pattern 111 may be partially covered by the first RF linker member 213.

The first RF contact 210 may be formed of a material having electrical conductivity. For example, the first RF contact 210 may be formed of a metal. The first RF contact 210 may be connected to any one of the RF contacts of the connector 300 according to the second example.

The second RF contact 220 is disposed to be spaced apart from the first RF contact 210 in the first axis direction (X-axis direction). The second RF contact 220 is for transmitting an RF signal. The second RF contact 220 may transmit a very high-frequency RF signal. The second RF contact 220 may be supported by the insulation part 240. The second RF contact 220 may be coupled to the insulation part 240 through an assembly process. The second RF contact 220 may be integrally formed with the insulation part 240 through injection molding.

Referring to FIGS. 2 to 6, the first RF contact 210 and the second RF contact 220 may be mounted on the first module 110 to be electrically connected to the first module 110. The first RF contact 210 and the second RF contact 220 may be connected to the RF contact of the connector 300 according to the second example, so as to be electrically connected to the second module 120 which is connected to the connector 300 according to the second example. Accordingly, the first module 110 and the second module 120 may be electrically connected. When the connector 200 according to the first example is a receptacle connector, the connector 300 according to the second example may be a plug connector. When the connector 200 according to the first example is a plug connector, the connector 300 according to the second example may be a receptacle connector.

Referring to FIG. 6, the second RF contact 220 may include a (2-1)th RF linker member 221, a (2-2)th RF linker member 222 and a second RF linker member 223. In this case, since the (2-1)th RF linker member 221, the (2-2)th RF linker member 222 and the second RF linker member 223 may be implemented to approximately coincide with the (1-1)th RF linker member 211, the first-second RF linker member 212 and the first RF linker member 213, respectively, the detailed descriptions thereof will be omitted.

The second RF linker member 223 may be mounted on the first module 110. Accordingly, the second RF contact 220 may be electrically connected to the first module 110 through the second RF linker member 223. For example, as illustrated in FIG. 6, a second RF mounting pattern 112 may be formed on the first module 110. The second RF mounting pattern 112 is for mounting the second RF contact 220. That is, in order for the second RF contact 220 to be electrically connected to the first module 110, the second RF contact 220 may be soldered to the second RF mounting pattern 112. The second RF linker member 223 may be mounted on the second RF mounting pattern 112. In this case, the second RF linker member 223 may be mounted on a part of the second RF mounting pattern 112. Accordingly, only a portion of the second RF mounting pattern 112 may be covered by the second RF linker member 223.

Referring to FIGS. 2 to 6, the cover shell 230 has the insulation part 240 coupled thereto. The cover shell 230 may be grounded by being mounted on the first module 110. For example, as illustrated in FIG. 6, a cover shell mounting pattern 114 may be formed on the first module 110. The cover shell mounting pattern 114 is for mounting the cover shell 230. That is, in order for the cover shell 230 to be grounded, the cover shell 230 may be soldered to the cover shell mounting pattern 114. Accordingly, the cover shell 230 may implement a shielding function of signals, electromagnetic waves and the like for each of the first RF contact 210 and the second RF contact 220. In this case, the cover shell 230 may prevent electromagnetic waves generated from the first RF contact 210 and the second RF contact 220 from interfering with signals of circuit components located in the vicinity of the electronic device, and it is possible to prevent electromagnetic waves generated from circuit components located around the electronic device from interfering with RF signals transmitted by the first RF contact 210 and the second RF contact 220. Accordingly, the connector 200 according to the first example may contribute to improving the EMI (Electro Magnetic Interference) shielding performance and the EMC (Electro Magnetic Compatibility) performance by using the cover shell 230. The cover shell 230 may be formed of a material having electrical conductivity. For example, the cover shell 230 may be formed of a metal.

The cover shell 230 may be disposed to surround the side of the inner space **230*a*. A portion of the insulation part 240 may be positioned in the inner space 230*a*. All of the first RF contact 210 and the second RF contact 220 may be located in the inner space 230*a*. In this case, the first RF linker member 213 and the second RF linker member 223 may also be all located in the inner space 230*a*. Accordingly, the cover shell 230 implements a shielding wall for all of the first RF contact 210 and the second RF contact 220 such that complete shielding can be implemented by strengthening the shielding function for the first RF contact 210 and the second RF contact 220. In addition, the ground contact 250 may be located in the inner space 230***a*. In this case, the ground connecting member 253 may be located in the inner space 230*a*. The connector 300 according to the second example may be inserted into the inner space 230*a*.

The cover shell 230 may be disposed to surround all sides with respect to the inner space 230*a*. The inner space 230*a* may be disposed inside the cover shell 230. When the cover shell 230 is formed in a quadrangular ring shape as a whole, the inner space 230*a* may be formed in a rectangular parallelepiped shape. In this case, the cover shell 230 may be disposed to surround four sides with respect to the inner space 230*a*.

The cover shell 230 may be integrally formed without a seam. The cover shell 230 may be integrally formed without a seam by a metal injection method such as a metal die casting method or a metal injection molding (MIM) method. The cover shell 230 may be integrally formed without a seam by CNC (Computer Numerical Control) machining, MCT (Machining Center Tool) machining or the like.

Referring to FIGS. 2 to 6, the insulation part 240 is a part to which the first RF contact 210 and the second RF contact 220 are coupled. The insulation part 240 may support the first RF contact 210 and the second RF contact 220. The insulation part 240 may be formed of an insulating material. The insulation part 240 may be coupled to the cover shell 230 such that the first RF contact 210, the second RF contact 220 and the ground contact 250 are located in the inner space 230*a*.

Figure 7:
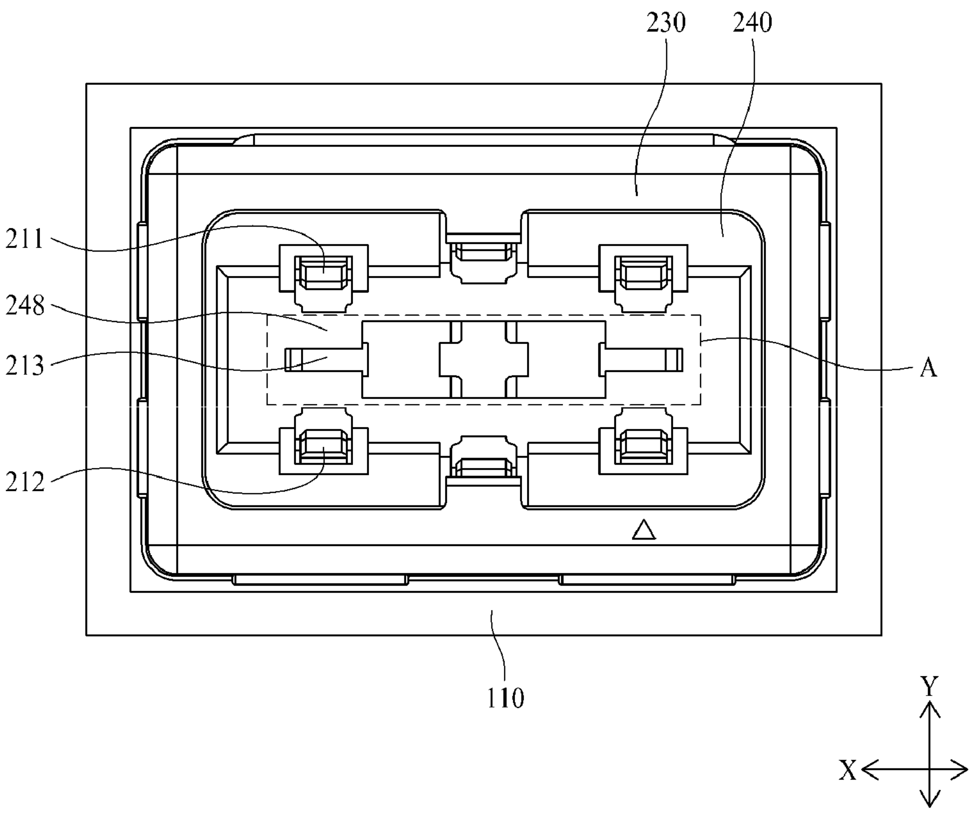
FIG. 7 is a schematic plan view of the connector according to the first example.
Figure 8:
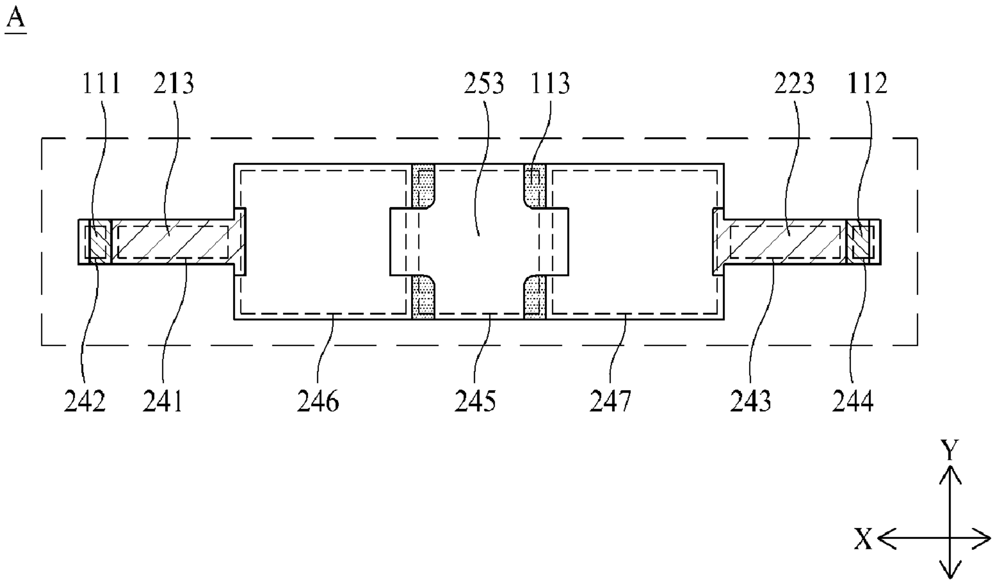
FIG. 8 is a partially enlarged view of part A of FIG. 7.

Referring to FIGS. 7 and 8, the insulation part 240 may include a first RF inspection window 241 and a first RF extension window 242.

The first RF inspection window 241 is disposed between the (1-1)th RF linker member 211 and the (1-2)th RF linker member 212 based on the second axis direction (Y-axis direction). The first RF linker member 213 may be disposed to be exposed through the first RF inspection window 241. In this case, the first RF inspection window 241 may expose the first RF linker member 213 with respect to the inner space 230*a*. Therefore, since the connector 200 according to the first example secures a space in which a probe can be disposed when conducting an energization test for the first RF contact 210 through the first RF inspection window 241, the operation for the energization test of the connector 200 according to the first example may be smoothly performed. The first RF inspection window 241 may be formed to pass through the insulation part 240. The first RF inspection window 241 may be disposed to overlap the first RF linker member 213 in the upper direction (Z-axis direction) of the first module 110.

The first RF extension window 242 is formed to be connected to the first RF inspection window 241. The first RF extension window 242 may be connected to be connected to each other with the first RF inspection window 241. The first RF extension window 242 may be formed to pass through the insulation part 240. The first RF extension window 242 may expose the first RF mounting pattern 111 on which the first RF linker member 213 is mounted. Accordingly, in the connector 200 according to the first example, the first RF extension window 242 may expose the first RF mounting pattern 111 to the inner space 230*a*. Accordingly, the connector 200 according to the first example may determine whether the first RF linker member 213 is mounted with the naked eye through the first RF extension window 242. The first RF extension window 242 may be formed to pass through the insulation part 240. The first RF extension window 242 may be disposed to overlap the first RF mounting pattern 111 in the upper direction (Z-axis direction) of the first module 110.

Referring to FIGS. 7 and 8, the insulation part 240 may include a second RF inspection window 243 and a second RF extension window 244.

The second RF inspection window 243 is disposed between the (2-1)th RF linker member 221 and the (2-2)th RF linker member 222 based on the second axis direction (Y-axis direction). The second RF linker member 223 may be disposed to be exposed through the second RF inspection window 243. In this case, the second RF inspection window 243 may expose the second RF linker member 223 to the inner space 230*a*. Therefore, the connector 200 according to the first example may determine whether the second RF contact 220 is mounted with the naked eye through the second RF inspection window 243. In addition, since the connector 200 according to the first example secures a space in which a probe can be disposed when conducting an energization test for the second RF contact 220 through the second RF inspection window 243, the operation for the energization test of the connector 200 according to the first example can be smoothly performed. The second RF inspection window 243 may be formed to pass through the insulation part 240. The second RF inspection window 243 may be disposed to overlap the second RF linker member 223 in the upper direction (Z-axis direction) of the first module 110. The second RF inspection window 243 may be disposed at a position symmetrical to the first RF inspection window 241 based on the second axis direction (Y-axis direction).

The second RF extension window 244 is formed to be connected to the second RF inspection window 243. The second RF extension window 244 may be connected to the second RF inspection window 243. The second RF extension window 244 may be formed to pass through the insulation part 240. The second RF extension window 244 may expose the second RF mounting pattern 112 on which the second RF linker member 223 is mounted. Accordingly, in the connector 200 according to the first example, the second RF extension window 244 may expose the second RF mounting pattern 112 to the inner space 230*a*. Accordingly, the connector 200 according to the first example can determine whether the second RF linker member 223 is mounted with the naked eye through the second RF extension window 244. The second RF extension window 244 may be disposed to overlap the second RF mounting pattern 112 in the upper direction (Z-axis direction) of the first module 110. The second RF extension window 244 may be disposed at a position symmetrical to the first RF extension window 242 based on the second axis direction (Y-axis direction).

Referring to FIGS. 2 to 6, the ground contact 250 is coupled to the insulation part 240 between the first RF contact 210 and the second RF contact 220. The ground contact 250 may be disposed between the first RF contact 210 and the second RF contact 220 based on the first axis direction (X-axis direction). The ground contact 250 is coupled to the insulation part 240. The ground contact 250 may be grounded by being mounted on the first module 110. The ground contact 250 may be coupled to the insulation part 240 through an assembly process. The ground contact 250 may be integrally formed with the insulation part 240 through injection molding.

The ground contact 250 may implement a shielding function for the first RF contact 210 and the second RF contact 220 together with the cover shell 230. The ground contact 250 may be formed of a material having electrical conductivity. For example, the ground contact 250 may be formed of a metal. When the connector 300 according to the second example is inserted into the inner space 230*a*, the ground contact may be connected to a partition wall part 360 (illustrated in FIG. 10) of the connector 300 according to the second example.

Referring to FIGS. 2 and 6, the ground contact 250 may include a first ground linker member 251, a second ground linker member 252 and a ground connecting member 253.

The first ground linker member 251 is for being connected to the partition wall part 360 of the connector 300 according to the second example. The first ground linker member 251 may be connected to one side of the partition wall part 360 of the connector 300 according to the second example.

The second ground linker member 252 is disposed to be spaced apart from the first ground linker member 251 based on the second axis direction (Y-axis direction). The second ground linker member 252 may be disposed to face each other with the first ground linker member 251 in the second axis direction (Y-axis direction). The second ground linker member 252 may be connected to the partition wall part 360 of the connector 300 according to the second example. The second ground linker member 252 may be connected to the other side of the partition wall part 360 of the connector 300 according to the second example. Accordingly, the first ground linker member 251 and the second ground linker member 252 may be connected to different portions of the partition wall part 360 of the connector 300 according to the second example to implement a double contact. The partition wall part 360 of the connector 300 according to the second example may be inserted between the second ground linker member 252 and the first ground linker member 251.

The ground connecting member 253 is disposed between the first ground linker member 251 and the second ground linker member 252 based on the second axis direction (Y-axis direction). The ground connecting member 253 is coupled to each of the first ground linker member 251 and the second ground linker member 252. Accordingly, the first ground linker member 251 and the second ground linker member 252 may be connected to each other through the ground connecting member 253. The ground connecting member 253 may be disposed between the first RF linker member 213 and the second RF linker member 223 based on the first axis direction (X-axis direction). The ground connecting member 253 may be mounted on the first module 110. The ground connecting member 253 may be grounded by being mounted on the first module 110. Accordingly, the ground contact 250 may be grounded to the first module 110 through the ground connecting member 253. For example, as illustrated in FIG. 6, a ground mounting pattern 113 may be formed on the first module 110. The ground mounting pattern 113 is for mounting the ground contact 250. That is, in order for the ground contact 250 to be grounded to the first module 110, the ground contact 250 may be soldered to the ground mounting pattern 113. The ground connecting member 253 may be mounted on the ground mounting pattern 113. The ground connecting member 253 may be mounted on a part of the ground mounting pattern 113. Accordingly, only a portion of the ground mounting pattern 113 may be covered by the ground connecting member 253.

Referring to FIGS. 2 to 8, the insulation part 240 may include a ground inspection window 245.

The ground inspection window 245 is disposed between the first ground linker member 251 and the second ground linker member 252 based on the second axis direction (Y-axis direction). The ground inspection window 245 may expose the ground connecting member 253 to the inner space 230*a*. Accordingly, the connector 200 according to the first example can visually determine whether the ground connecting member 253 is mounted through the ground inspection window 245. The ground inspection window 245 may be disposed to be spaced apart from the first RF inspection window 241 based on the first axis direction (X-axis direction). The ground inspection window 245 may be disposed to be spaced apart from the second RF inspection window 243 based on the first axis direction (X-axis direction). The ground inspection window 245 may be disposed to overlap the ground connecting member 253 in the upper direction (Z-axis direction) of the first module 110.

Meanwhile, based on the second axis direction (Y-axis direction), the length of the ground connecting member 253 is formed to be longer than the length of the first RF linker member 213. Accordingly, based on the second axis direction (Y-axis direction, the length of the ground inspection window 245 exposing the ground connecting member 253 to the inner space 230*a* may be formed to be longer than the length of the first RF inspection window 241 exposing the first RF linker member 213 to the inner space 230*a*. That is, the cross-sectional area of the ground inspection window 245 may be formed to be larger than the cross-sectional area of the first RF inspection window 241. Accordingly, the connector 200 according to the first example is implemented such that the area exposed by the ground connecting member 253 to the inner space 230*a* through the ground inspection window 245 is increased, and thus, the determination of whether the ground contact 250 is mounted and the energization test may be performed more easily.

Referring to FIGS. 2 to 8, the insulation part 240 may include a first connection window 246.

The first connection window 246 is disposed between the first RF inspection window 241 and the ground inspection window 245 based on the first axis direction (X-axis direction). The first connection window 246 may be coupled to be connected to each of the first RF inspection window 241 and the ground inspection window 245. Accordingly, the connector 200 according to the first example may expose the ground mounting pattern 113 on which the ground connecting member 253 is mounted through the first connection window 246. Therefore, the connector 200 according to the first example is implemented such that the ground mounting pattern 113 is exposed to the inner space 230*a*, and thus, the work for the energization test of the ground connecting member 253 may be smoothly performed.

The first connection window 246 may be connected to each of the first RF inspection window 241 and the ground inspection window 245. In this case, the first connection window 246 may be connected to each of first RF inspection window 241 and the ground inspection window 245. The first RF inspection window 241 and the ground inspection window 245 may be connected to each other through the first connection window 246. Accordingly, the connector 200 according to the first example is implemented such that the first RF inspection window 241 and the ground inspection window 245 are connected to each other, and thus, in the process of conducting an energization test by using a probe (not illustrated), it is possible to minimize the positional movement of the probe in the height direction. Accordingly, the connector 200 according to the first example can shorten the time required for the energization test through the first connection window 246.

Referring to FIGS. 2 to 8, the insulation part 240 may include a second connection window 247.

The second connection window 247 is disposed between the first RF inspection window 241 and the ground inspection window 245 based on the first axis direction (X-axis direction). The second connection window 247 may be coupled to be connected to each of the first RF inspection window 241 and the ground inspection window 245. Accordingly, the connector 200 according to the first example may expose the ground mounting pattern 113 on which the ground connecting member 253 is mounted through the second connection window 247. Therefore, the connector 200 according to the first example is implemented such that the ground mounting pattern 113 is exposed to the inner space 230*a*, and thus, the work for the energization test of the ground connecting member 253 may be smoothly performed.

The second connection window 247 may be connected to each of the first RF inspection window 241 and the ground inspection window 245. In this case, the second connection window 247 may be connected to each of the first RF inspection window 241 and the ground inspection window 245. The first RF inspection window 241 and the ground inspection window 245 may be connected to each other through the second connection window 247. Accordingly, the connector 200 according to the first example is implemented such that the first RF inspection window 241 and the ground inspection window 245 are connected to each other, and thus, in the process of conducting an energization test by using a probe (not illustrated), it is possible to minimize the positional movement of the probe in the height direction. Therefore, the connector 200 according to the first example can shorten the time required for the energization test through the second connection window 247.

Referring to FIGS. 2 to 8, the first connection window 246 and the second connection window 247 may be formed to pass through the insulation part 240. The first connection window 246 and the second connection window 247 may be disposed on both sides of the ground inspection window 245 in the first axis direction (X-axis direction). For example, as illustrated in FIG. 6, when the first connection window 246 is disposed on the left side of the ground inspection window 245, the second connection window 247 may be disposed on the right side of the ground inspection window 245. On the other hand, when the second connection window 247 is disposed on the left side of the ground inspection window 245, the first connection window 246 may be disposed on the right side of the ground inspection window 245. Hereinafter, it will be described on the basis that the first connection window 246 is disposed on the left side of the ground inspection window 245, and the second connection window 247 is disposed on the right side of the ground inspection window 245.

The first connection window 246 may be disposed between the first RF inspection window 241 and the ground inspection window 245. The first connection window 246 may be disposed between the first RF inspection window 241 and the ground inspection window 245 based on first axis direction (X-axis direction). The first connection window 246 may be coupled to each of the first RF inspection window 241 and the ground inspection window 245. In this case, the first connection window 246 may be coupled to be connected to each of the first RF inspection window 241 and the ground inspection window 245. Accordingly, the first RF inspection window 241 and the ground inspection window 245 may be connected to each other through the first connection window 246.

The second connection window 247 may be disposed between the second RF inspection window 243 and the ground inspection window 245. The second connection window 247 may be disposed between the second RF inspection window 243 and the ground inspection window 245 based on the first axis direction (X-axis direction). The second connection window 247 may be coupled to each of the second RF inspection window 243 and the ground inspection window 245. In this case, the second connection window 247 may be coupled to be connected to each of the second RF inspection window 243 and the ground inspection window 245. Accordingly, the second RF inspection window 243 and the ground inspection window 245 may be connected to each other through the second connection window 247.

Figure 9:
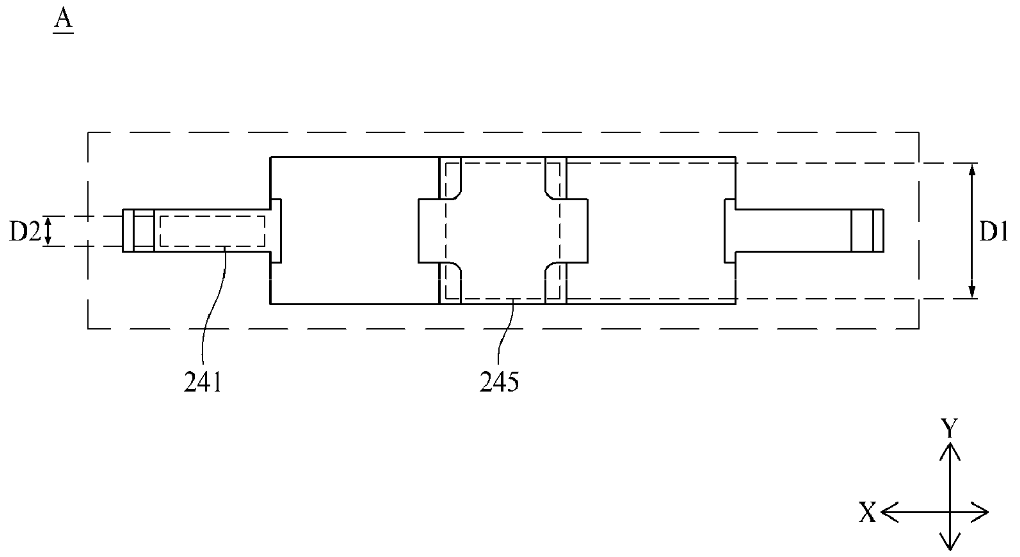
FIG. 9 is a partially enlarged view for explaining the length relationship between the ground inspection window and the first RF inspection window in the connector according to the first example.

Referring to FIGS. 7 to 9, based on the second axis direction (Y axis direction), the length of the ground inspection window 245 in the width direction (hereinafter, referred to as a 'first length D1') may be longer than the length of the first RF inspection window 241 in the width direction (hereinafter, referred to as a 'second length D2'). Accordingly, the connector 200 according to the first example may be implemented such that the area of the ground connecting member 253 exposed through the ground inspection window 245 is increased. Therefore, in the connector 200 according to the first example, the space for conducting an energization test through the probe is increased, and thus, the energization test may be performed more easily.

Referring to FIG. 7, the insulation part 240 may include a fixing member 248.

The fixing member 248 is disposed between the (1-1)th RF linker member 211 and the first RF linker member 213. The fixing member 248 may be disposed between the (1-1)th RF linker member 211 and the first RF linker member 213 based on the second axis direction (Y-axis direction). The fixing member 248 may be disposed to cover a portion of the first RF linker member 213 based on the upper direction (Z-axis direction) of the first module 110. In this case, the fixing member 248 may support the first RF contact 210 by pressing the first RF linker member 213. Accordingly, the connector 200 according to the first example presses the portion on which the first RF linker member 213 is mounted through the fixing member 248, and thus, it may be implemented such that the fixing force of the first linker member fixed to the first module 110 may be increased. Therefore, the connector 200 according to the first example can prevent the first RF contact 210 from being separated from the first module 110. The fixing member 248 may be formed on the insulation part 240. The fixing member 248 may support the first RF linker member 213 together with the first module 110.

A plurality of fixing members 248 may be formed. The fixing members 248 may be disposed on both sides of the first RF linker member 213 based on the second axis direction (Y-axis direction). In this case, the fixing members 248 may be disposed to cover both sides of the first RF linker member 213. Accordingly, the connector 200 according to the first example may support the first RF linker member 213 through the fixing members 248 at both sides. Therefore, in the connector 200 according to the first example, the fixing force for fixing the first RF linker member 213 to the first module 110 may be further increased. The fixing members 248 may be disposed on both sides of the first RF inspection window 241 based on the second axis direction (Y-axis direction). The fixing member 248 may be formed as a part of the insulation part 240.

Connector According to the Second Example

Referring to FIGS. 2 to 4, 10 and 11, the connector 300 according to the second example may include a first RF contact 310, a second RF contact 320, an insulation part 330, a first coaxial cable 340, a second coaxial cable 350, a partition wall part 360 and a cover shell 380.

The first RF contact 310 and the second RF contact 320 are for transmitting radio frequency (RF) signals. The second RF contact 320 may be disposed to be spaced apart from the first RF contact 310 in a first axis direction (X-axis direction).

The insulation part 330 is to be coupled to the first RF contact 310 and the second RF contact 320. The insulation part 330 may be coupled to the cover shell 380. The first RF contact 310 and the second RF contact 320 may be connected to the connector 200 according to the first example in a state of being supported by the insulation part 330.

Figure 3:
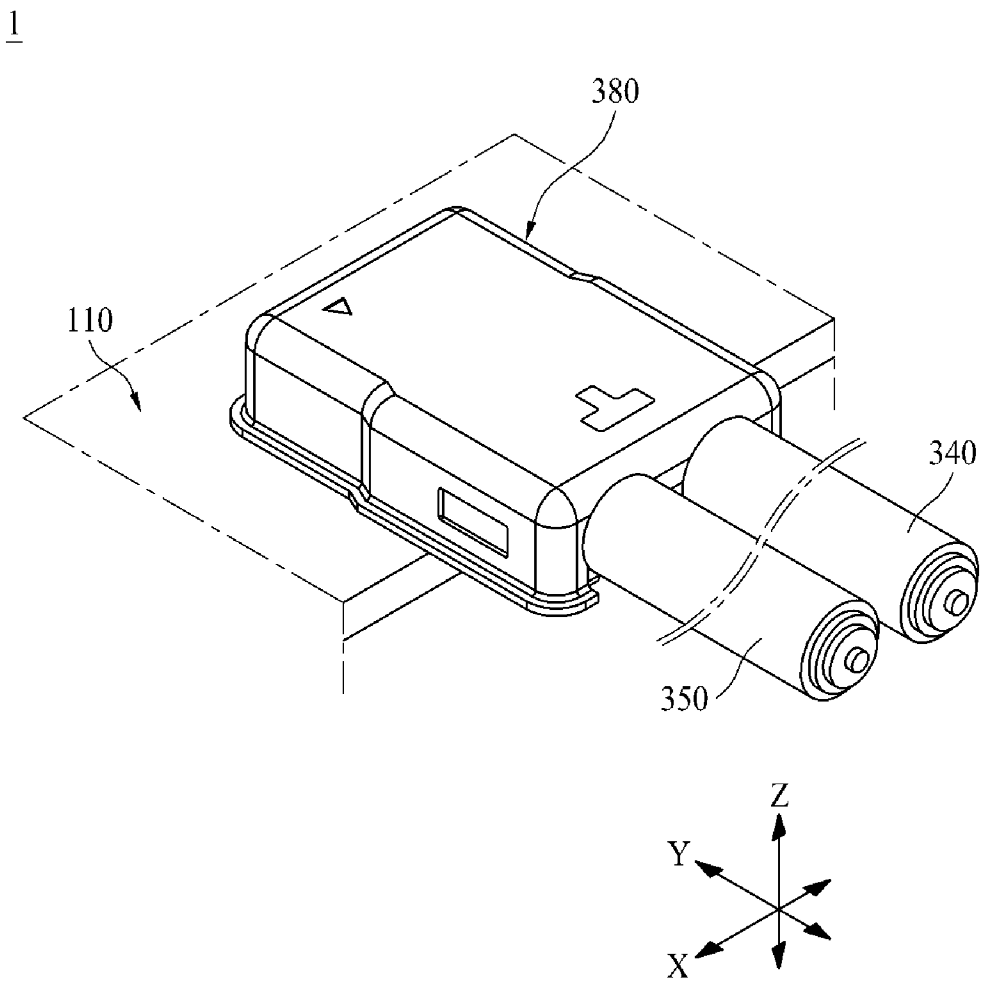
FIG. 3 is a schematic perspective view showing a state in which the connector according to the first example and the connector according to the second example are coupled in the connector according to the present disclosure.
Figure 4:
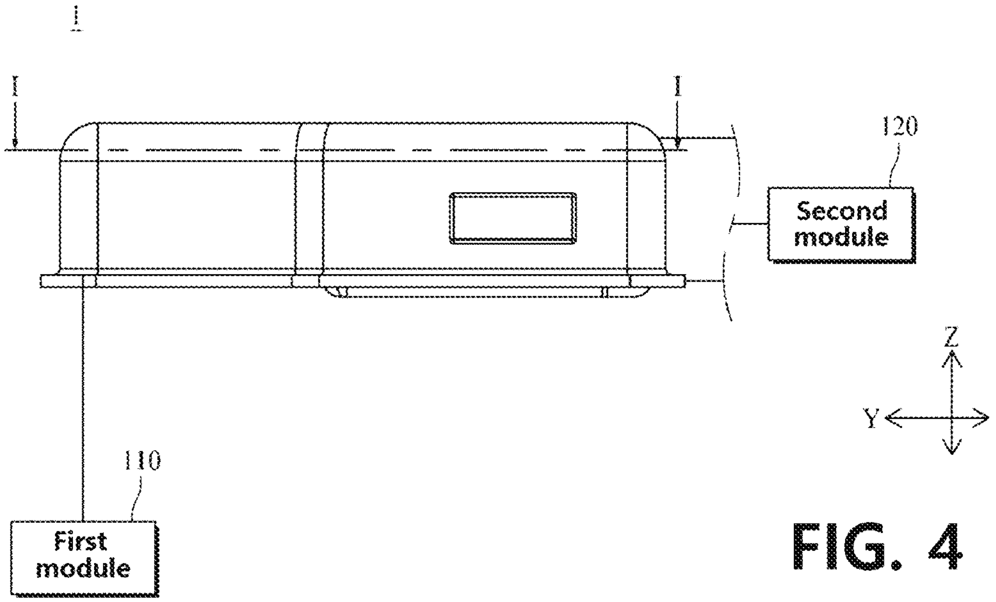
FIG. 4 is a schematic side view of the connector according to the present disclosure.
Figure 5:
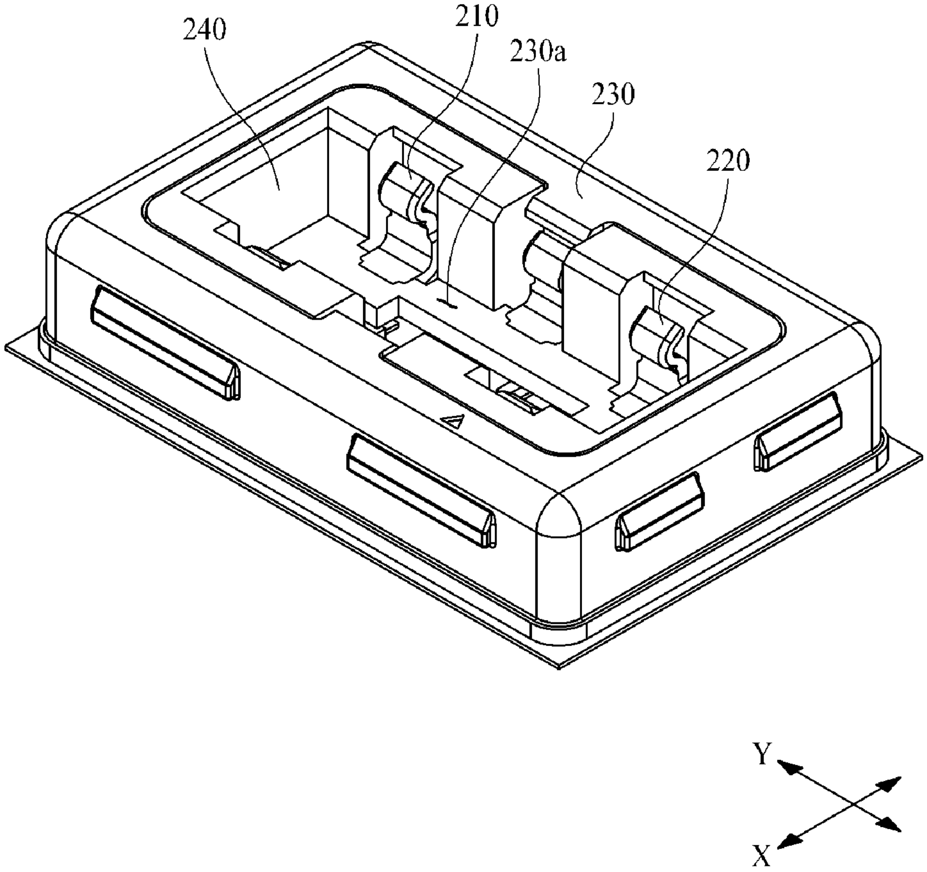
FIG. 5 is a schematic perspective view of the connector according to the first example.

The first coaxial cable 340 is electrically connected to the first RF contact 310. The first coaxial cable 340 may be connected to the connector 200 according to the first example through the first RF contact 310. Accordingly, the first coaxial cable 340 may be electrically connected to the first module 110. Referring to FIGS. 3 and 4, while being electrically connected to the first module 110 by using flexibility, the first coaxial cable 340 may be electrically connected to the second module 120 which is disposed to be spaced apart from the first module 110. For example, the first coaxial cable 340 may be directly electrically connected to the second module 120. For example, the first coaxial cable 340 may be electrically connected to the second module 120 by being connected to a counterpart connector (not illustrated) of the second module 120. Accordingly, the connector 300 according to the second example can electrically connect the first module 110 and the second module 120 that are disposed to be spaced apart from each other by using the first coaxial cable 340.

The second coaxial cable 350 is electrically connected to the second RF contact 320. The second coaxial cable 350 may be connected to the connector 200 according to the first example through the second RF contact 320. Accordingly, the second coaxial cable 350 may be electrically connected to the first module 110. Referring to FIGS. 3 and 4, while being electrically connected to the first module 110 by using flexibility, the second coaxial cable 350 may be electrically connected to the second module 120 which is disposed to be spaced apart from the first module 110. For example, the second coaxial cable 350 may be directly electrically connected to the second module 120. For example, the second coaxial cable 350 may be electrically connected to the second module 120 by being connected to a counterpart connector (not illustrated) of the second module 120. Accordingly, the connector 300 according to the second example may electrically connect the first module 110 and the second module 120 that are disposed to be spaced apart from each other by using the second coaxial cable 350.

Accordingly, the connector 300 according to the second example can achieve the following operational effects.

First, the connector 300 according to the second is implemented to electrically connect the first module 110 and the second module 120 that are disposed to be spaced apart from each other by using the first coaxial cable 340 and the second coaxial cable 350 having flexibility. Therefore, not only when the first module 110 and the second module 120 are spaced apart from each other, but also when the first module 110 and the second module 120 are disposed to face different directions from each other, the connector 300 according to the second example may implement an electrical connection through the first board connector 34 by using the coaxial cables 5, 6, which are relatively cheaper than a flexible printed circuit board (not illustrated). Accordingly, the connector 300 according to the second example can reduce the cost for electrically connecting the first module 110 and the second module 120 when compared to the comparative example of using a flexible circuit board.

Second, the connector 300 according to the second example is implemented to transmit a plurality of RF signals by using the first coaxial cable 340 and the second coaxial cable 350. Therefore, the connector 300 according to the second example can be utilized more suitably in an electronic device such as a mobile device or an antenna transceiver device that requires the transmission of several signals in a limited space, compared to the comparative example where a single RF signal is transmitted by using one RF signal transmission cable.

Referring to FIGS. 2 to 4 and 10 to 12, the partition wall part 360 is coupled to the cover shell 380. Based on the first axis direction (X-axis direction), the first RF contact 310 and the first coaxial cable 340 are disposed on one side of the partition wall part 360, and the second RF contact 320 and the second coaxial cable 350 may be disposed on the other side of the partition wall part 360. That is, the partition wall part 360 may be disposed between the first RF contact 310 and the first coaxial cable 340 and between the second RF contact 320 and the second coaxial cable 350. Accordingly, the connector 300 according to the second example may implement a shielding function between the first coaxial cable 340 and the first RF contact 310 and between the second coaxial cable 350 and the second RF contact 320 by using the partition wall part 360. Therefore, the connector 300 according to the second example is implemented to transmit a plurality of RF signals by using a plurality of coaxial cables, while preventing the RF signals from interfering with each other. For example, the connector 300 according to the second example may shield a first signal line which is implemented as the first RF contact 310 and the first coaxial cable 340 are electrically connected, and a second signal line which is implemented as the second RF contact 320 and the second coaxial cable 350 are electrically connected by using the partition wall part 360. Therefore, the connector 300 according to the second example may use the partition wall part 360 to contribute to improving the EMI (Electro Magnetic Interference) shielding performance and the EMC (Electro Magnetic Compatibility) performance between RF signals through coaxial cables. The partition wall part 360 may be formed of a material having electrical conductivity. For example, the partition wall part 360 may be formed of a metal. The partition wall part 360 may be grounded by being connected to the ground contact 250 of the connector 200 according to the first example.

Hereinafter, the first RF contact 310, the second RF contact 320, the insulation part 330, the first coaxial cable 340, the second coaxial cable 350, the partition wall part 360 and the cover shell 380 will be described in detail with reference to the accompanying drawings.

Referring to FIGS. 2 to 4 and 10 to 12, the first RF contact 310 and the second RF contact 320 are for transmitting radio frequency (RF) signals. The first RF contact 310 and the second RF contact 320 may transmit a very high-frequency RF signal. The first RF contact 310 and the second RF contact 320 may be supported by the insulation part 330. The first RF contact 310 and the second RF contact 320 may be coupled to the insulation part 330 through an assembly process. The first RF contact 310 and the second RF contact 320 may be integrally molded with the insulation part 330 through injection molding.

The first RF contact 310 and the second RF contact 320 may be disposed to be spaced apart from each other based on the first axis direction (X-axis direction). The first RF contact 310 and the second RF contact 320 may be electrically connected to the first module 110 by being connected to the connector 200 according to the first example.

Meanwhile, in FIGS. 2 to 12, the connector 300 according to the second example is illustrated to include two RF contacts by including only the first RF contact 310 and the second RF contact 320, but the present disclosure is not limited thereto, and the connector 300 according to the second example may include three or more RF contacts. In this case, the connector 300 according to the second example may include coaxial cables to correspond to the number of RF contacts. For example, when the connector 300 according to the second example is provided with three RF contacts, three coaxial cables may also be provided. In the present specification, the connector 300 according to the second example will be described on the basis of including two RF contacts, that is, the first RF contact 310 and the second RF contact 320. From this, it will be apparent to those skilled in the art to which the present disclosure pertains to derive an exemplary embodiment in which the connector 300 according to the second example is provided with three or more RF contacts and coaxial cables.

Figure 10:
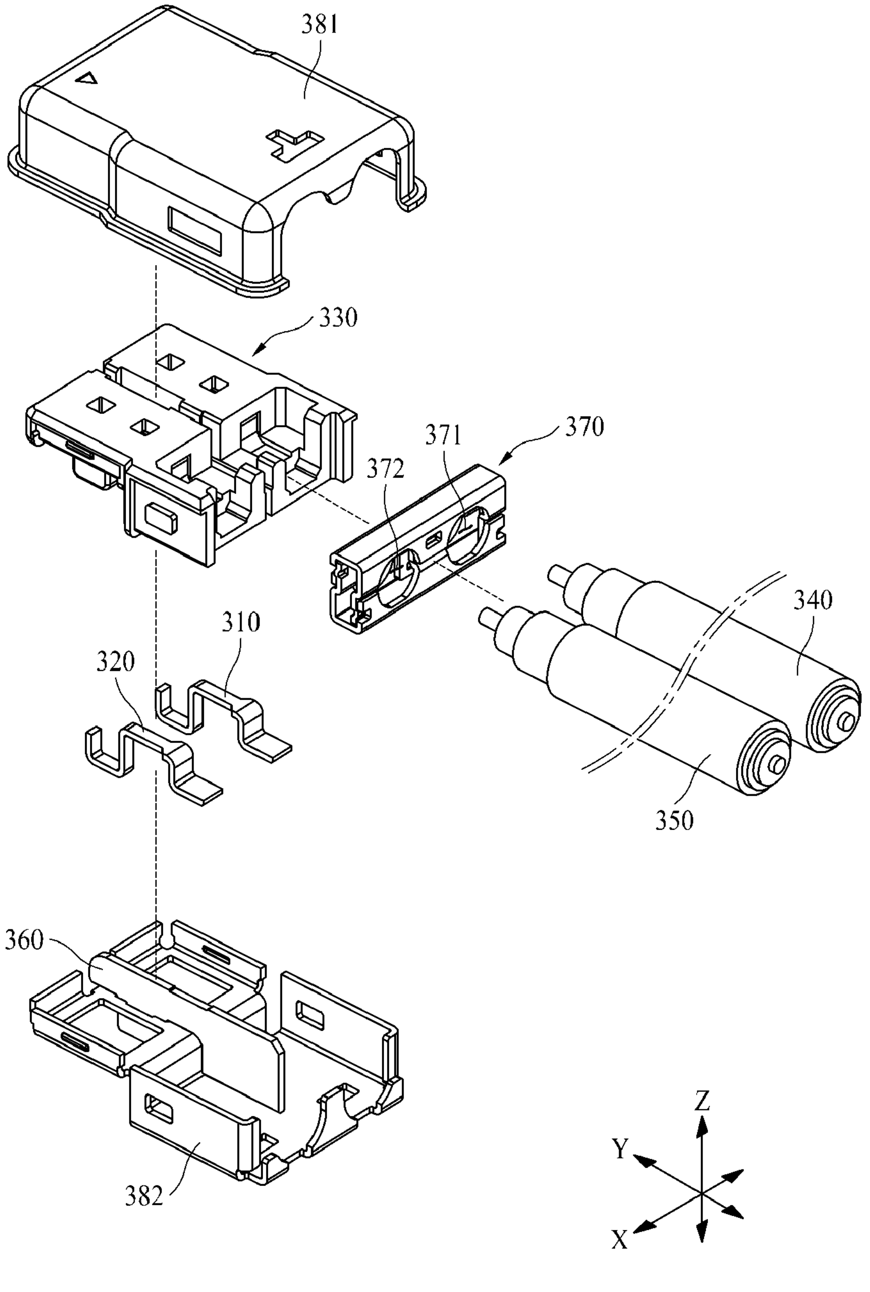
FIGS. 10 and 11 are schematic exploded perspective views of the connector according to the second example.
Figure 11:
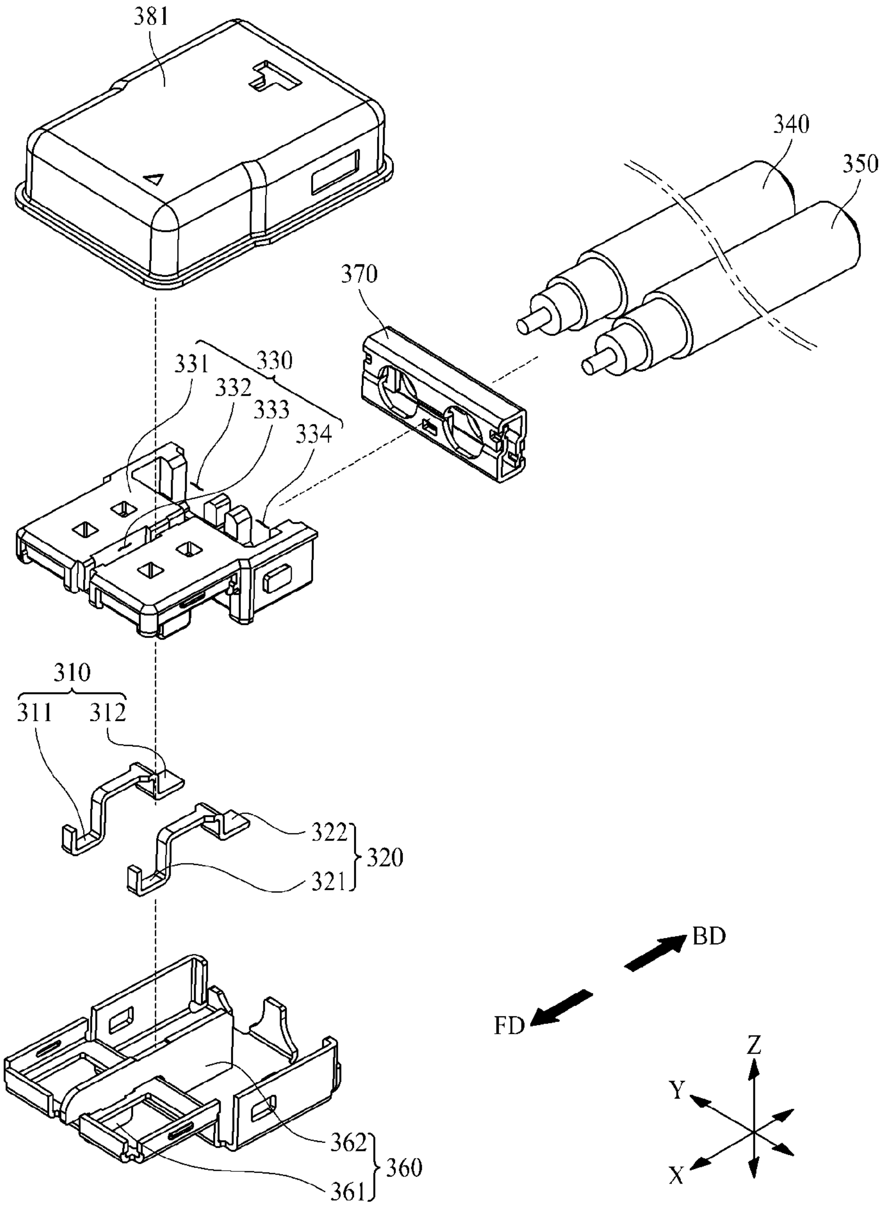
Figure 12:
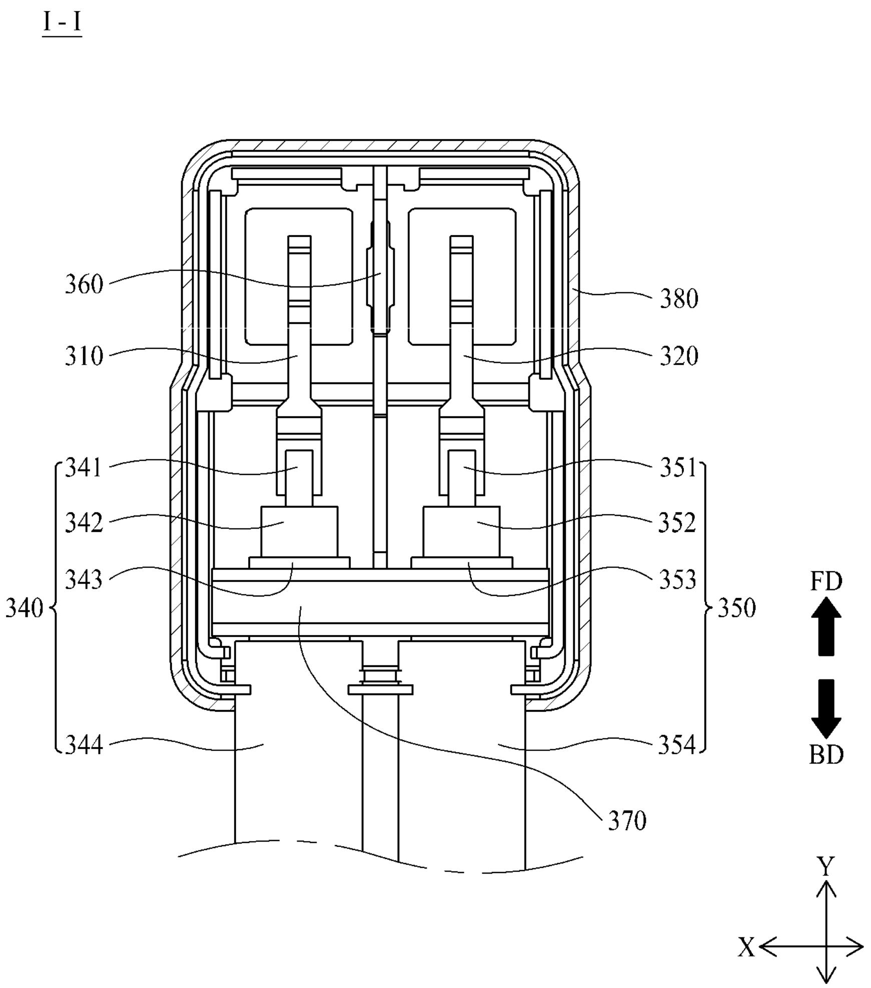
FIG. 12 is a schematic plan sectional view taken on the basis of line I-I of FIG. 4.
Figure 13:
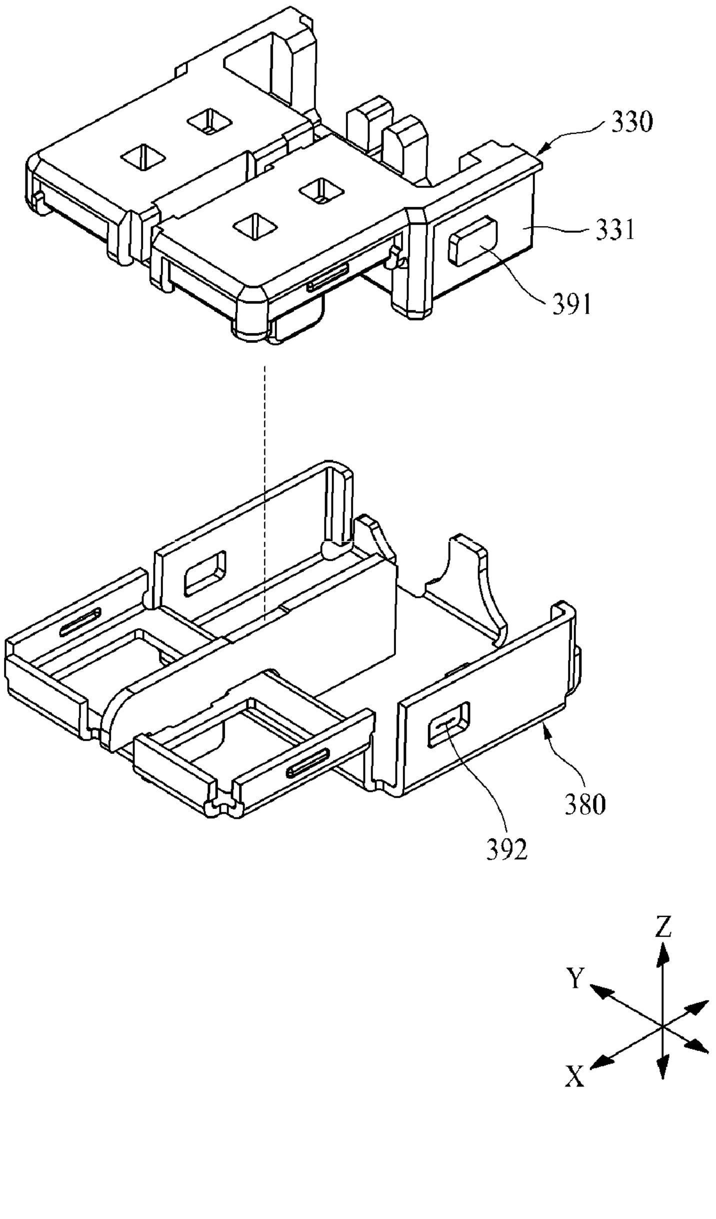
FIG. 13 is a schematic side view of a locking part in the connector according to the second example.

Referring to FIGS. 10 to 12, the first RF contact 310 may include a first RF linker member 312 and a first RF linker member 311.

The first RF linker member 312 is electrically connected to the first coaxial cable 340. The first coaxial cable 340 may be electrically connected to the first RF linker member 311 through the first RF linker member 312. Accordingly, the first coaxial cable 340 may be connected to the connector 200 according to the first example through the first RF linker member 311. The first RF linker member 312 may be disposed inside the insulation part 330. The first RF linker member 312 may be integrally molded with the insulation part 330 through injection molding.

The first RF linker member 311 is to be connected to the connector 200 according to the first example. The first RF linker member 311 may be connected to an RF contact of the connector 200 according to the first example. Accordingly, the first coaxial cable 340 may be connected to the connector 200 according to the first example. The first RF linker member 311 may be coupled to the insulation part 330 to be exposed to the outside. The first RF linker member 311 may be connected to the connector 200 according to the first example through a connection hole (not illustrated) which is formed in the cover shell 380.

The first RF contact 310 may be formed of a material having electrical conductivity. For example, the first RF contact 310 may be formed of a metal.

Referring to FIGS. 10 to 12, the second RF contact 320 may include a second RF linker member 322 and a second RF linker member 321. The second RF linker member 322 and each of the second RF linker member 321 may be implemented to approximately coincide with each of the first RF linker member 312 and the first RF linker member 311, and thus, the detailed descriptions thereof will be omitted.

The insulation part 330 supports the first RF contact 310 and the second RF contact 320, and the first coaxial cable 340 and the second coaxial cable 350. The first RF contact 310 and the second RF contact 320, and the first coaxial cable 340 and the second coaxial cable 350 may be coupled to the insulation part 330. The insulation part 330 may be formed of an insulating material.

Referring to FIGS. 10 to 12, the insulation part 330 may include an insulating body 331, a partition wall groove 332, a first cable accommodating groove 333 and a second cable accommodating groove 334.

The insulating body 331 forms the overall outer shape of the insulation part 330. The insulating body 331 may be accommodated in the cover shell 380. The partition wall groove 332 is for accommodating the partition wall part 360. The partition wall groove 332 may be implemented by forming a groove by a predetermined depth from the upper surface of the insulating body 331. The partition wall part 360 may be inserted into the partition wall groove 332 to be coupled to the insulation part 330. The first cable accommodating groove 333 is for accommodating the first coaxial cable 340. The first cable accommodating groove 333 may be implemented by forming a groove by a predetermined depth from the upper surface of the insulating body 331. The first coaxial cable 340 may be inserted into the first cable accommodating groove 333 to be coupled to the insulation part 330. The first RF linker member 312 and the first coaxial cable 340 may be in contact through the first cable accommodating groove 333. The second cable accommodating groove 334 is for accommodating the second coaxial cable 350. The second cable accommodating groove 334 may be implemented by forming a groove by a predetermined depth from the upper surface of the insulating body 331. The second coaxial cable 350 may be inserted into the second cable accommodating groove 334 to be coupled to the insulation part 330. The second RF linker member 322 and the second coaxial cable 350 may be in contact through the second cable accommodating groove 334.

The first coaxial cable 340 is for electrically connecting the first module 110 and the second module 120 that are disposed to be spaced apart from each other. One end of the first coaxial cable 340 may be electrically connected to the first module 110, and the other end thereof may be electrically connected to the second module 120. In this case, the first coaxial cable 340 may be electrically connected to the first module 110 through the first RF contact 310. The first coaxial cable 340 may include a first connection pin 341, a first internal insulating member 342, a first shield member 343 and a first external insulating member 344. The first connection pin 341 is electrically connected to the first RF linker member 311. The first connection pin 341 may be in contact with the first RF linker member 311 through the first cable accommodating groove 333 to be electrically connected to the first RF linker member 311. The first internal insulating member 342 is coupled to the first connection pin 341. The first internal insulating member 342 may be coupled to the first connection pin 341 to surround the outside of the first connection pin 341. The first connection pin 341 may be coupled to the first internal insulating member 342 such that a portion thereof is exposed to the outside from the first internal insulating member 342. Accordingly, the first connection pin 341 may be implemented such that the remaining portion except for the portion that is electrically connected to the first RF linker member 311 is insulated. The first internal insulating member 342 may be formed of an insulating material. The first shield member 343 performs a shielding function for the first connection pin 341. The first shield member 343 may prevent electromagnetic waves and RF signals generated from the first connection pin 341 from being radiated to the outside. The first shield member 343 may be coupled to the first internal insulating member 342 to surround the outside of the first internal insulating member 342. The first shield member 343 may be formed of a conductive material. For example, the first shield member 343 may be formed of a metal. The first external insulating member 344 is coupled to the first shield member 343. The first external insulating member 344 may be coupled to the first shield member 343 to surround the outside of the first shield member 343. The first shield member 343 may be coupled to the first external insulating member 344 such that a portion thereof is exposed to the outside from the first external insulating member 344. The first external insulating member 344 may be formed of an insulating material.

The second coaxial cable 350 is for electrically connecting the first module 110 and the second module 120 that are disposed to be spaced apart from each other. One end of the first coaxial cable 340 may be electrically connected to the first module 110, and the other end thereof may be electrically connected to the second module 120. In this case, the second coaxial cable 350 may be electrically connected to the first module 110 through the second RF contact 320. The second coaxial cable 350 may include a second connection pin 351, a second internal insulating member 352, a second shield member 353 and a second external insulating member 354. The second connection pin 351 is electrically connected to the second RF linker member 31. The second connection pin 351 may be in contact with the second RF linker member 31 through the second cable accommodating groove 334 to be electrically connected to the second RF linker member 31. The second internal insulating member 352 is coupled to the second connection pin 351. The second internal insulating member 352 may be coupled to the second connection pin 351 to surround the outside of the second connection pin 351. The second connection pin 351 may be coupled to the second internal insulating member 352 such that a portion thereof is exposed to the outside from the second internal insulating member 352. Accordingly, the second connection pin 351 may be implemented such that the remaining portion except for the portion that is electrically connected to the second RF linker member is insulated from the outside. The second internal insulating member 352 may be formed of an insulating material. The second shield member 353 performs a shielding function for the second connection pin 351. The second shield member 353 may prevent electromagnetic waves and RF signals generated from the second connection pin 351 from being radiated to the outside. The second shield member 353 may be coupled to the second internal insulating member 352 to surround the outside of the second internal insulating member 352. The second shield member 353 may be formed of a conductive material. For example, the second shield member 353 may be formed of a metal. The second external insulating member 354 is coupled to the second shield member 353. The second external insulating member 354 may be coupled to the second shield member 353 to surround the outside of the second shield member 353. The second shield member 353 may be coupled to the second external insulating member 354 such that a portion thereof is exposed to the outside from the second external insulating member 354. The second external insulating member 354 may be formed of an insulating material.

Referring to FIGS. 2 to 12, the partition wall part 360 is coupled to the cover shell 380. The partition wall part 360 may be grounded to perform a shielding function. Based on the first axis direction (X-axis direction), the first RF contact 310 and the first coaxial cable 340 are disposed on one side of the partition wall part 360, and the second RF contact 320 and the second coaxial cable 350 may be disposed on the other side of the partition wall part 360. Accordingly, the partition wall part 360 prevents RG signals generated from the first RF contact 310 and the first coaxial cable 340 and RF signals generated from the second RF contact 320 and the second coaxial cable 350 from interfering with each other. In addition, since the connector 300 according to the second example can increase the shielding between the first RF contact 310 and the second RF contact 320 without increasing the separation distance between the first RF contact 310 and the second RF contact 320 through the partition wall part 360, it can contribute to the miniaturization of the product.

The partition wall part 360 may be formed of a material having electrical conductivity. For example, the partition wall part 360 may be formed of a metal. The partition wall part 360 may be formed of a thin plate made of metal. The partition wall part 360 may be implemented such that a plurality of plates overlap with each other in the first axis direction (X-axis direction). The partition wall part 360 may be grounded by being connected to a counter ground contact of the connector 200 according to the first example. The partition wall part 360 may be coupled to the insulation part 330 through an assembly process. The partition wall part 360 may be inserted into the partition wall groove 332 to be coupled to the insulation part 330.

Referring to FIGS. 10 to 12, the partition wall part 360 may include a partition wall body 361 and a ground member 362.

The partition wall body 361 is accommodated in the partition wall groove 332. The partition wall body 361 may be accommodated in the partition wall groove 332 to be disposed inside the insulating body 331. The partition wall body 361 may be coupled to the cover shell 380. The first RF contact 310 and the first coaxial cable 340 may be disposed on one side of the partition wall body 361, and the second RF contact 320 and the second coaxial cable 350 may be disposed on the other side of the partition wall body 361. Accordingly, the connector 300 according to the second example may shield between the first RF contact 310 and the first coaxial cable 340, and between the second RF contact 320 and the second coaxial cable 350 through the partition wall body 360. The partition wall body 361 may be formed of a thin plate made of a conductive material. For example, the partition wall body 361 may be formed of a thin metal plate. The partition wall body 361 may be formed of a plurality of plates.

The ground member 362 is connected to the ground contact 250 of the connector 200 according to the first example to be grounded. The ground member 362 may be formed to protrude from the partition wall body 361. The ground member 362 may be formed to protrude downward (Z-axis direction) from the partition wall body 361. The ground member 362 may be formed to protrude from the insulating body 331 to the outside. Meanwhile, the ground member 362 may be grounded through the cover shell 380. The ground member 362 may extend in a second axis direction (Y-axis direction) that is perpendicular to the first axis direction (X-axis direction) to be connected to the cover shell 380 to be grounded.

Referring to FIGS. 2 to 4 and 10 to 12, the cover shell 380 is coupled to the insulation part 330. The cover shell 380 may be coupled to the insulation part 330 to cover at least a portion of the insulation part 330. The insulation part 330 may be accommodated in an accommodating groove (not illustrated) which is formed in the cover shell 380. The rear surface of the cover shell 380 may be formed to be open such that the first coaxial cable 340 and the second coaxial cable 350 are inserted. The first coaxial cable 340 and the second coaxial cable 350 may be coupled to the insulation part 330 through the rear surface of the cover shell 380.

The cover shell 380 may include a first cover shell 381 and a second cover shell 382.

The first cover shell 381 accommodates the insulation part 330. The first cover shell 381 may be formed with a connection hole (not illustrated) for exposing the first RF linker member 311 and the second RF linker member 31 to the outside in a state where the insulation part 330 is accommodated. The connection hole may be formed to pass through a lower portion of the first cover shell 381. The first RF linker member 311 and the second RF linker member 31 are implemented to be connected to the RF connector of the connector 200 according to the first example through the connection hole.

Referring to FIGS. 2 to 4 and 10 to 12, the second cover shell 382 is disposed under the insulation part 330. The second cover shell 382 may be detachably coupled to the first cover shell 381. The second cover shell 382 may be integrally formed with the first cover shell 381. Hereinafter, the case in which the second cover shell 382 is detachably coupled to the first cover shell 381 will be described. The second cover shell 382 may be coupled to the partition wall part 360. The second cover shell 382 may be integrally formed with the partition wall part 360. The second cover shell 382 may be formed of a conductive material. For example, the second cover shell 382 may be formed of a metal material.

Referring to FIGS. 10 to 12, the connector 300 according to the second example may include an alignment part 370. The alignment part 370 is for aligning the first coaxial cable 340 and the second coaxial cable 350. The alignment part 370 may be coupled to the first coaxial cable 340 and the second coaxial cable 350 to align the first coaxial cable 340 and the second coaxial cable 350. The first coaxial cable 340 is inserted into a first cable insertion hole 371 which is formed in the alignment part 370 to be coupled to the alignment part 370, and the second coaxial cable 350 is inserted into a second cable insertion hole 372 which is formed in the alignment part to be coupled to the alignment part 370. The second cable insertion hole 372 may be formed in the alignment part 370 to be spaced apart from the first cable insertion hole 371 in the first axis direction (X-axis direction). Accordingly, while the first coaxial cable 340 and the second coaxial cable 350 are spaced apart in the first axis direction (X-axis direction), the connector 300 according to the second example is implemented to be coupled to the alignment part 370. Therefore, in the connector 300 according to the second example, by using the alignment part 370 to maintain a state in which the first coaxial cable 340 and the second coaxial cable 350 are spaced apart from each other along the first axis direction (X-axis direction), it is possible to reduce the degree of damage or breakage as the first coaxial cable 340 and the second coaxial cable 350 interfere with each other due to vibration or shaking.

The alignment part 370 may be coupled to the second cover shell 382. The second cover shell 382 may include an alignment accommodating groove 921 and an alignment support part 922. The alignment accommodating groove 921 is for accommodating the alignment part 370. The alignment accommodating groove 921 may be disposed at a rear side (BD arrow direction) of the insulation part 330 based on the second axis direction (Y-axis direction). The alignment accommodating groove 921 may be implemented to communicate with the first cable accommodating groove 333 and the second cable accommodating groove 334. Accordingly, when the alignment part 370 is accommodated in the alignment accommodating groove 921 in a state of being coupled to the first coaxial cable 340 and the second coaxial cable 350, the first coaxial cable 340 and the second coaxial cable 350 are inserted into the first cable accommodating groove 333 and the second cable accommodating groove 334, respectively, so as to be electrically connected to the first RF contact 310 and the second RF contact 320.

The partition wall part 360 extends forward (FD arrow direction) based on the second axis direction (Y-axis direction) to be connected to the front shielding member 911, and it may extend backward (BD arrow direction) based on the second axis direction (Y-axis direction) to be connected to the alignment part 370. Accordingly, when the ground member 362 of the partition wall part 360 is grounded to a counterpart ground contact of the connector 200 according to the first example, the front shielding member 911 may be grounded through the partition wall part 360, and the alignment part 370 may be grounded through the partition wall part 360.

Referring to FIGS. 9 to 14, the cover shell 380 may include a locking part 390.

The locking part 390 is fixed by using a hook of the insulation part 330. The cover shell 380 and the insulation part 330 may be coupled to each other through the locking part 390.

Figure 14:
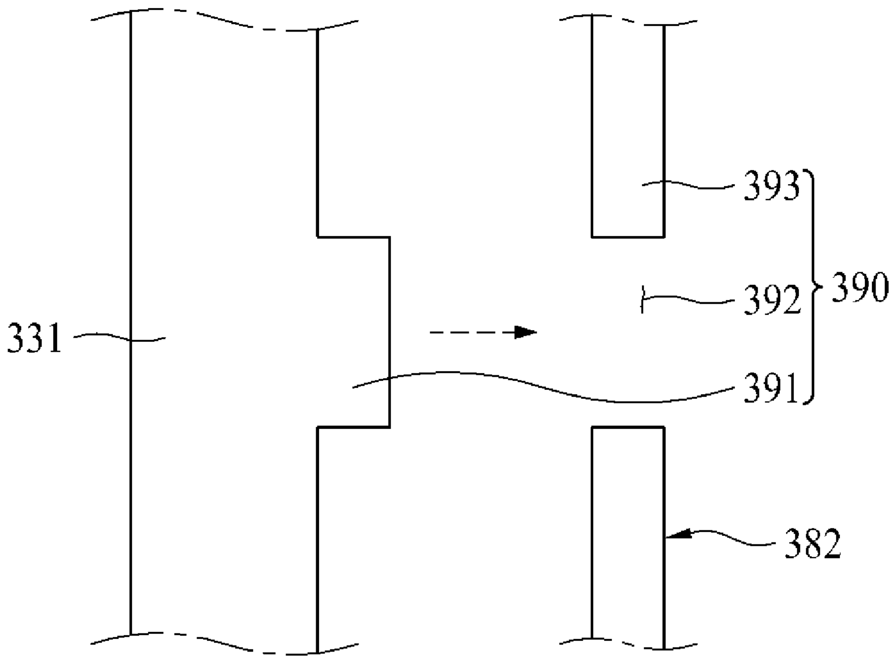
FIG. 14 is a conceptual view of a locking part in the connector according to the second example.

As illustrated in FIG. 14, the locking part 390 may include a locking protrusion 391, a locking groove 392 and a support protrusion 393.

The locking protrusion 391 is formed on the insulation part 330. The locking protrusion 391 may protrude from the insulating body 331.

The locking groove 392 may be formed in the cover shell 380. In this case, the locking groove 392 may be formed in the second cover shell 382. The locking groove 392 may be implemented as a groove that is cut to a predetermined depth in the cover shell 380. In this case, the locking protrusion 391 may be coupled to be inserted into the locking groove 392. In addition, the locking groove 392 may be implemented as a hole penetrating the cover shell 380. In this case, the locking protrusion 391 may be coupled to pass through the locking groove 392.

The support protrusion 393 is inserted into the locking groove 392 to support the locking protrusion 391. The support protrusion 393 supports the locking protrusion 391, thereby preventing the insulation part 330 from being separated from the cover shell 380. Accordingly, in the connector 300 according to the second example, the insulation part 330 and the cover shell 380 may be maintained to be firmly coupled to each other through the support protrusion 393. Accordingly, the connector 300 according to the second example can prevent the insulation part 330 and the cover shell 380 from being separated from each other due to external impact. The support protrusion 393 may be implemented as a part of the insulation part 330. The support protrusion 393 may support the locking protrusion 391 which is inserted into the locking groove 392.

The present disclosure described above is not limited to the above-described exemplary embodiments and the accompanying drawings, and it will be apparent to those skilled in the art to which the present disclosure pertains that various substitutions, modifications and changes are possible within the scope of the technical spirit of the present disclosure.

The invention claimed is:

1. A connector, comprising:

a first radio frequency (RF) contact for transmitting an RF signal;

a second RF contact which is arranged to be spaced apart from the first RF contact in a first axis direction (X-axis direction);

an insulation part to which the first RF contact and the second RF contact are coupled; and a cover shell to which the insulation part is coupled and which is disposed to surround an inner space, wherein the first RF contact comprises:

a (1-1)th RF linker member for connecting with an RF contact of a counterpart connector;

a (1-2)th RF linker member which is arranged to be spaced apart from the (1-1)th RF linker member based on a second axis direction (Y-axis direction) that is perpendicular to the first axis direction (X-axis direction); and a first RF linker member which is arranged between the (1-1)th RF linker member and the (1-2)th RF linker member based on the second axis direction (Y-axis direction), wherein the insulation part comprises a first RF inspection window which is arranged between the (1-1)th RF linker member and the (1-2)th RF linker member based on the second axis direction (Y-axis direction) and is formed to pass through the insulation part, and wherein the first RF linker member is arranged to be exposed through the first RF inspection window so that whether the first RF linker member is mounted can be visually confirmed.

2. The connector of claim 1, wherein the insulation part comprises a first RF extension window which is formed to be connected to the first RF inspection window, and wherein the first RF extension window exposes a first RF mounting pattern on which the first RF linker member is mounted.

3. The connector of claim 1, further comprising:

a ground contact which is coupled to the insulation part between the first RF contact and the second RF contact, wherein the ground contact comprises a first ground linker member for being connected to a partition wall of the counterpart connector, a second ground linker member which is disposed to be spaced apart from the first ground linker member based on the second axis direction (Y-axis direction), and a ground connecting member which is disposed between the first ground linker member and the second ground linker member based on the second axis direction (Y axis direction), wherein the insulation part comprises a ground inspection window which is disposed between the first ground linker member and the second ground linker member based on the second axis direction (Y-axis direction), and wherein the ground connecting member is disposed to be exposed through the ground inspection window.

4. The connector of claim 3, wherein the insulation part comprises a first connection window which is disposed between the first RF inspection window and the ground inspection window based on the first axis direction (X-axis direction), and wherein the first connection window is coupled to be connected to each of the first RF inspection window and the ground inspection window.

5. The connector of claim 3, wherein based on the second axis direction (Y-axis direction), the length of the ground inspection window in the width direction is longer than the length of the first RF inspection window in the width direction.

6. The connector of claim 1, wherein the first RF contact comprises a first RF linker member which is coupled to each of the (1-1)th RF linker member and the (1-2)th RF linker member, wherein the insulation part comprises a fixing member which is disposed between the (1-1)th RF linker member and the first RF linker member, and wherein the fixing member is configured to press the first RF linker member to support the first RF contact.

7. The connector of claim 1, wherein the insulation part comprises a second RF inspection window which is disposed to be spaced apart from the first RF inspection window based on the first axis direction (X-axis direction), wherein the second RF contact comprises a second RF linker member which is spaced apart from the first RF linker member based on the first axis direction (X-axis direction), and wherein the second RF linker member is disposed to be exposed through the second RF inspection window.

8. A connector, comprising:

a first radio frequency (RF) contact for transmitting an RF signal;

a second RF contact which is arranged to be spaced apart from the first RF contact in a first axis direction (X-axis direction);

an insulation part to which the first RF contact and the second RF contact are coupled;

a cover shell to which the insulation part is coupled and which is disposed to surround an inner space; and a ground contact which is coupled to the insulation part between the first RF contact and the second RF contact, wherein the ground contact comprises:

a first ground linker member for being connected to a partition wall of a counterpart connector, a second ground linker member which is disposed spaced apart from the first ground linker member based on a second axis direction (Y-axis direction) that is perpendicular to the first axis direction (X-axis direction), and a ground connecting member which is disposed between the first ground linker member and the second ground linker member based on the second axis direction (Y axis direction), wherein the insulation part comprises a ground inspection window which is disposed between the first ground linker member and the second ground linker member based on the second axis direction (Y-axis direction), and wherein the ground connecting member is disposed to be exposed toward the inner space through the ground inspection window so that whether the ground connecting member is mounted can be visually confirmed.

9. The connector of claim 8, further comprising:

a first RF inspection window which is disposed to be spaced apart from the ground inspection window based on the first axis direction (X-axis direction), wherein the cross-sectional area of the ground inspection window is larger than the cross-sectional area of the first RF inspection window.

10. The connector of claim 8, further comprising:

a first RF inspection window which is disposed to be spaced apart from the ground inspection window based on the first axis direction (X-axis direction), wherein the insulation part comprises a first linker window which is disposed between the first RF inspection window and the ground inspection window so as to be connected to each of the first RF inspection window and the ground inspection window based on the first axis direction (X-axis direction), and a second linker window which is spaced apart from the first linker window and configured to be connected to the ground inspection window based on the first axis direction (X-axis direction).

11. A connector, comprising:

a first radio frequency (RF) contact for transmitting an RF signal;

a second RF contact which is arranged to be spaced apart from the first RF contact in a first axis direction (X-axis direction);

an insulation part to which the first RF contact and the second RF contact are coupled;

a cover shell in which the insulation part is received and coupled;

a first coaxial cable which is electrically connected to the first RF contact; and a second coaxial cable which is spaced apart from the first coaxial cable along the first axial direction (X-axis direction) and electrically connected to the second RF contact, wherein the cover shell comprises a locking part which is fixed to the insulation part by using a hook, and wherein the cover shell is configured to form a continuous surface without a seam that is disposed on an upper side, a left side, a right side, and a front side of the insulation part.

12. The connector of claim 11, wherein the locking part comprises a locking protrusion which is formed on the insulation part, a locking groove which is formed on the cover shell, and a support protrusion for supporting the locking protrusion which is inserted into the locking groove.

13. The connector of claim 11, further comprising:

a partition wall part which is coupled to the cover shell such that the first RF contact and the first coaxial cable are disposed on one side, and the second RF contact and the second coaxial cable are disposed on the other side, based on the first axis direction (X-axis direction), wherein the partition wall part is grounded through the cover shell to shield between the first RF contact and the first coaxial cable, and between the second RF contact and the second coaxial cable.

14. The connector of claim 11, further comprising:

an alignment part which is coupled to the first coaxial cable and the second coaxial cable, wherein the rear surface of the cover shell is formed to be open such that the first coaxial cable and the second coaxial cable are inserted, and wherein the alignment part is coupled to the cover shell to shield the rear of the cover shell.

* * * * *